Dec. 9, 1947. H. C. GLITSCH Re. 22,946

BUBBLE TOWER

Original Filed Jan. 28, 1939 5 Sheets-Sheet 1

Inventor
Hans C. Glitsch

By

Jack A. Ashley

Attorney

Dec. 9, 1947. H. C. GLITSCH Re. 22,946
BUBBLE TOWER
Original Filed Jan. 28, 1939 5 Sheets-Sheet 2
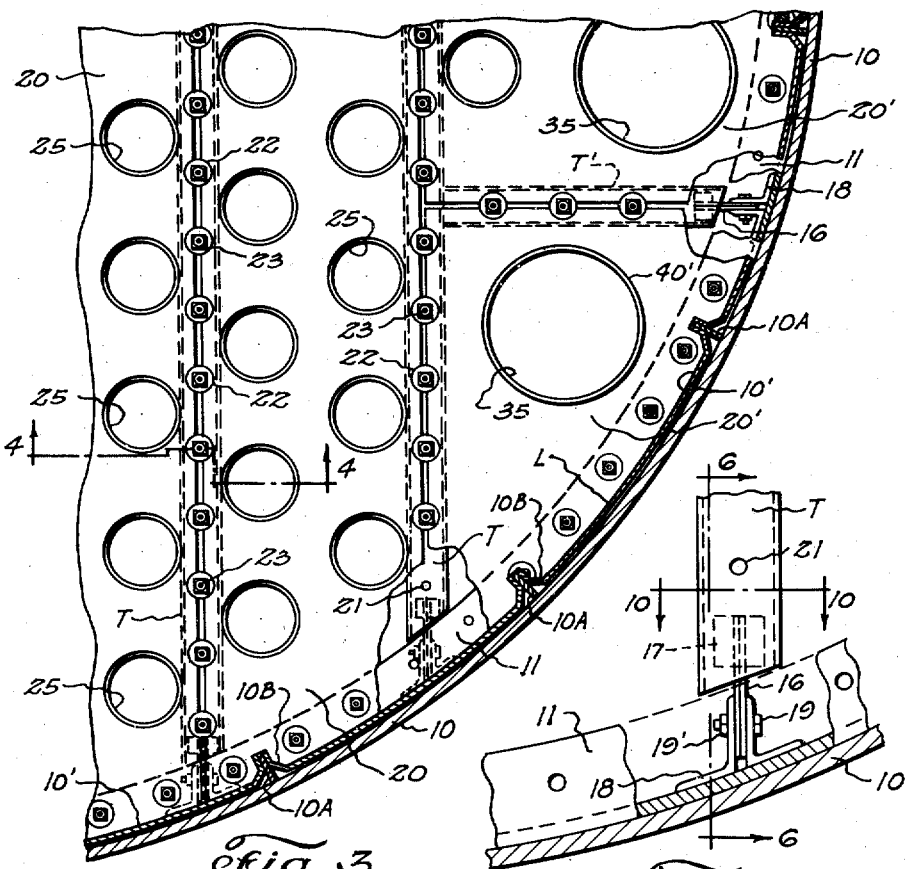
Fig. 3.
Fig. 5.
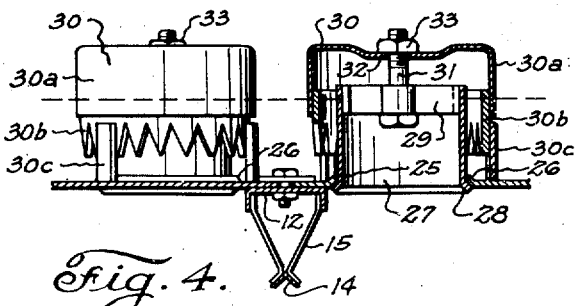
Fig. 4.
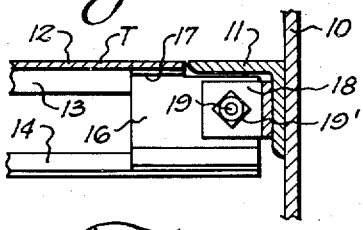
Fig. 6.
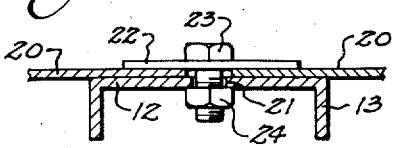
Fig. 7.
Inventor
Hans C. Glitsch
By
Attorney Dec. 9, 1947. H. C. GLITSCH Re. 22,946

BUBBLE TOWER

Original Filed Jan. 28, 1939 5 Sheets-Sheet 3

Inventor
Hans C. Glitsch

By Jack A. Ashley
Attorney

Dec. 9, 1947. H. C. GLITSCH Re. 22,946

BUBBLE TOWER

Original Filed Jan. 28, 1939 5 Sheets-Sheet 4

Inventor
Hans C. Glitsch

By Jack A. Ashley

Attorney

Dec. 9, 1947. H. C. GLITSCH Re. 22,946

BUBBLE TOWER

Original Filed Jan. 28, 1939 5 Sheets-Sheet 5

Inventor
Hans C. Glitsch

By Jack A. Ashley
Attorney

Reissued Dec. 9, 1947 Re. 22,946

UNITED STATES PATENT OFFICE 22,946

BUBBLE TOWER

Hans C. Glitsch, Dallas, Tex., assignor, by mesne assignments, to Glitsch Engineering Company, Dallas, Tex., a partnership composed of Fritz W. Glitsch, Jr., and Hans C. Glitsch Original No. 2,210,808, dated August 6, 1940, Serial No. 253,294, January 28, 1939. Application for reissue August 6, 1947, Serial No. 766,729

18 Claims. (Cl. 261—114)

Figure 1:
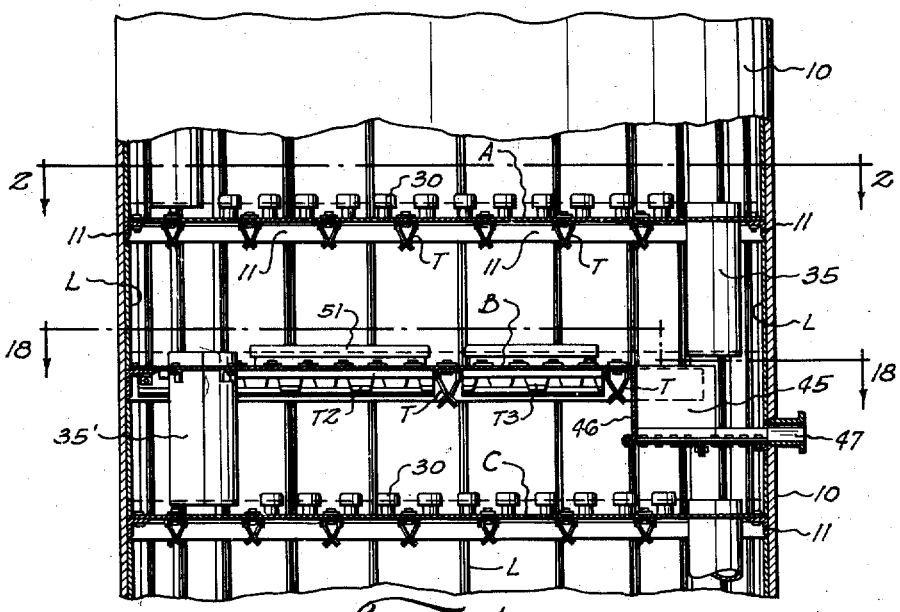

This invention relates to new and useful improvements in bubble towers.

As is well known, bubble towers are employed in the refining industry for fractionating hydrocarbon liquids and it has been the practice to construct such towers by mounting a plurality of bubble trays at different elevations within a cylindrical tank. The hydrocarbon liquid is suitably heated and is then conducted to the tower to separate the liquid and vapors, fractional condensation of the vapors being affected by passing said vapors upwardly through the tower and contacting said vapors with a downwardly flowing liquid reflux at the multiplicity of levels, as determined by the location of the bubble trays.

The usual bubble trays are ordinarily constructed of metal and are supported at their marginal edge portions on an annular flange secured to the inside wall of the tank. Since there is no support for the intermediate or central portion of each tray, said tray must be constructed of a relatively thick metal so as to give said tray sufficient rigidity and strength. The trays are, of course, contacted by the hydrocarbon liquid and are, therefore, subjected to the corrosive action of the acids present in said liquid and are also contacted by the vapors within the tank; for this reason, it is desirable to construct the trays of stainless steel, or other corrosion resistant metal, so as to prolong the life of said trays. However, a metal, such as stainless steel, which is resistant to corrosion is comparatively expensive and to construct a tray of this material and of sufficient thickness for the necessary rigidity and strength would be prohibitive because of the excessive cost. For this reason, it has been the practice to construct the trays of a cheaper metal, such as steel or cast iron. A tray constructed of this cheaper metal makes it possible to give the tray the thickness which is necessary at a relatively reasonable cost but such trays are subject to corrosion and are not satisfactory. Further, the necessary thickness of the metal adds much weight to the tray, making the same difficult to handle in assembling the tower. Also, it would be desirable to construct the tank itself of stainless steel but obviously, this would be prohibitive.

From the foregoing, it is manifest that it is desirable that the bubble trays be constructed of a relatively thin and light metal which is resistant to corrosion and it is one object of this invention to provide a bubble tower, wherein such trays may be employed, whereby the disadvantages present in the usual type of trays now in general use, are obviated.

An important object of the invention is to provide an improved bubble tower wherein transversely extending truss members are mounted within the tank and are adapted to support the bubble trays; the truss members serving to support each tray substantially through its entire area, whereby said tray may be constructed of a thin metal which is resistant to corrosion since the truss members give the tray the necessary rigidity and strength.

A particular object of the invention is to provide a bubble tower having the bubble trays supported on transverse truss members, which members are fabricated of a light metal, such as stainless steel, whereby said members are resistant to corrosion and yet are of sufficient strength to support said tray.

Another object of the invention is to provide an improved bubble tower of the character described, wherein each tray floor may be constructed in sections, with improved means of fastening the sections to their supporting members; the fastening means being such that it is unnecessary to provide bolt holes in the sections and yet said sections may undergo limited movement or "breathing" due to thermal contraction and expansion.

A further object of the invention is to provide a bubble tray constructed of a relatively thin metal and which has openings therein for receiving the usual bubble cap risers, said openings being surrounded by an annular lip or flange which is formed by bending the metal of which the tray is formed; said lip not only providing a means for co-acting with the riser to hold the same in place, but also acting as a reinforcing rib to add rigidity to the tray.

Another object of the invention is to provide an improved bubble tower having its inner wall covered by a corrosive resistant liner and also having a plurality of bubble trays constructed of relatively thin stainless steel therein, together with improved risers and downcomers, also constructed of stainless steel, whereby all of the interior metal of the tower is non-corrosive and the life of the tower is materially increased.

Still another object of the invention is to provide a bubble tower, wherein the take off wells are fabricated of stainless steel and also wherein improved bubble caps constructed of stainless steel are employed on the trays of said tower.

A construction designed to carry out the invention will be hereinafter described, together with other features of the invention.

Figure 2:
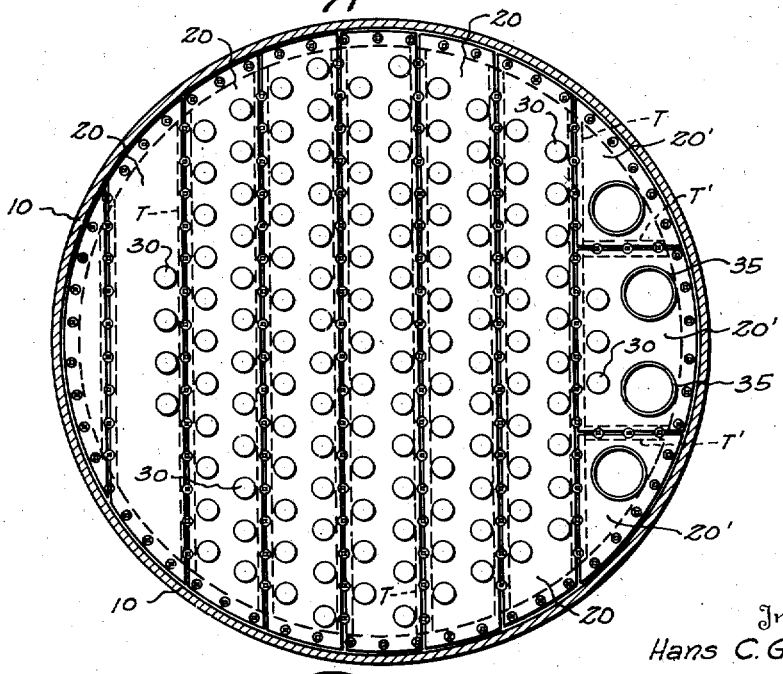
Figure 8:
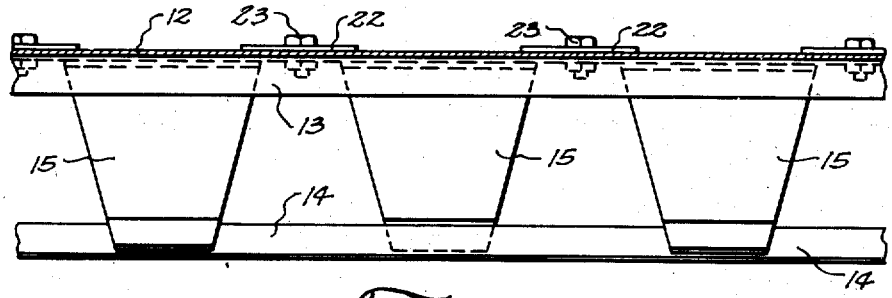
Figure 10:
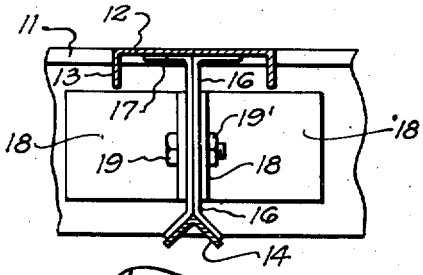
Figure 12:
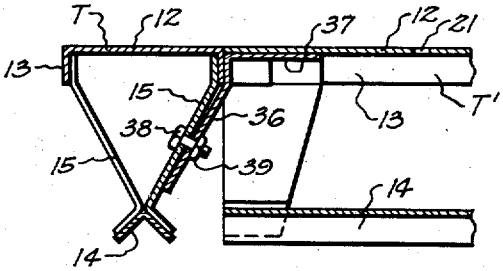
Figure 11:
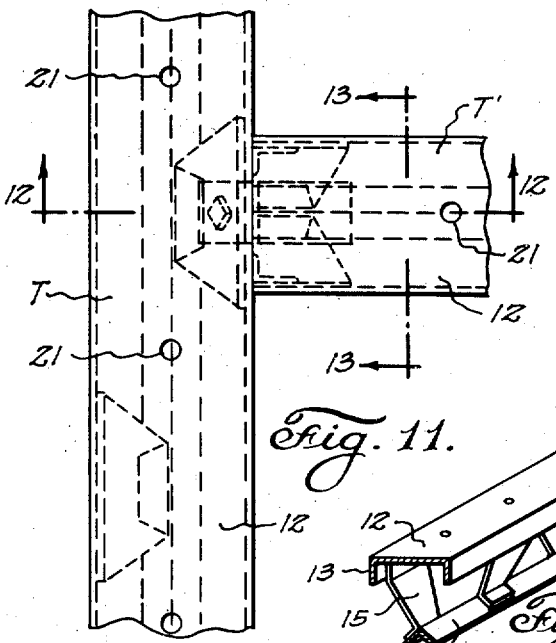
Figure 13:
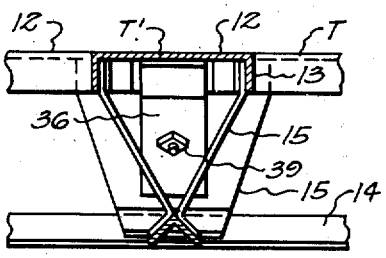
Figure 9:
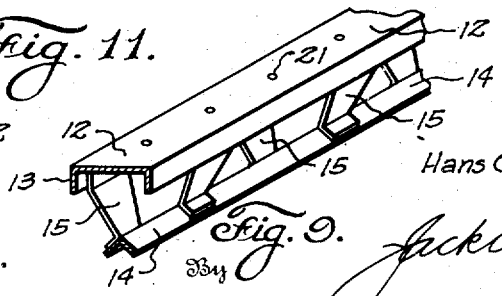
Figure 18:
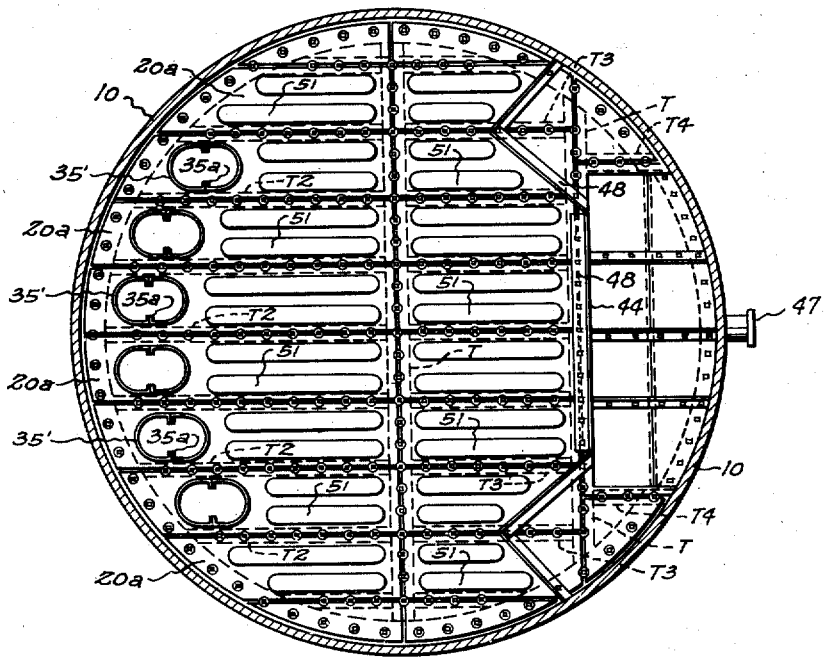
Figure 14:
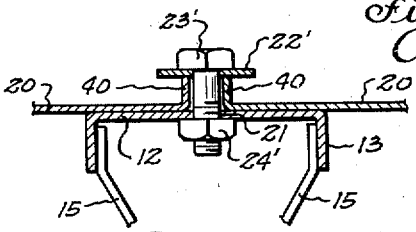
Figure 15:
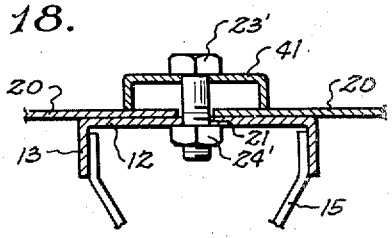
Figure 16:
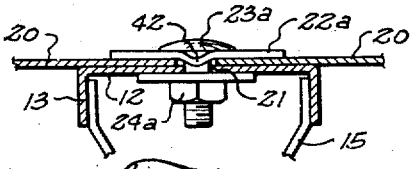
Figure 17:
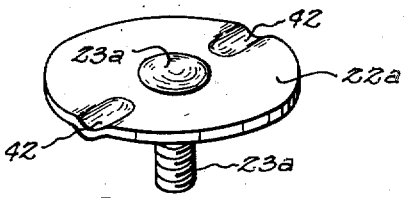
Figure 19:
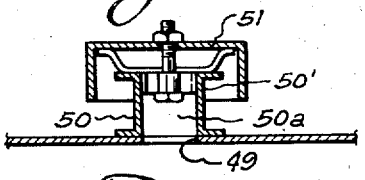
Figure 20:
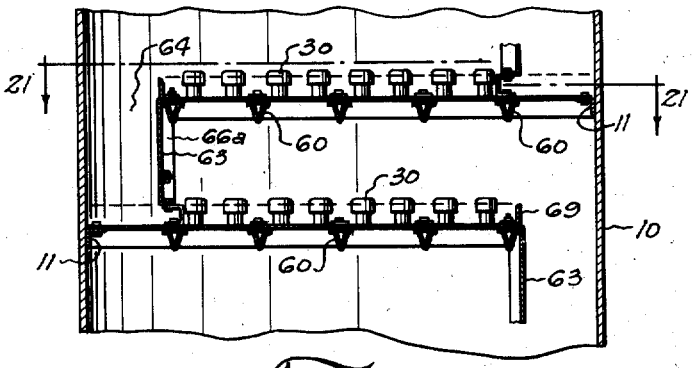
Figure 22:
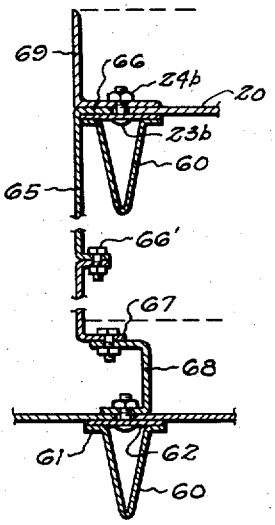
Figure 21:
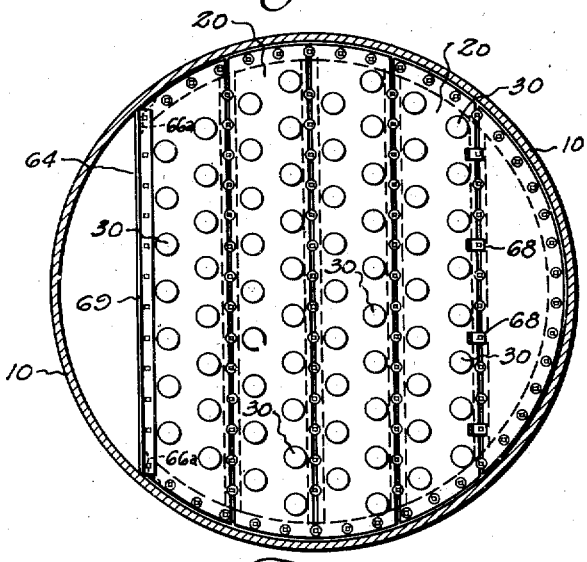
Figure 23:
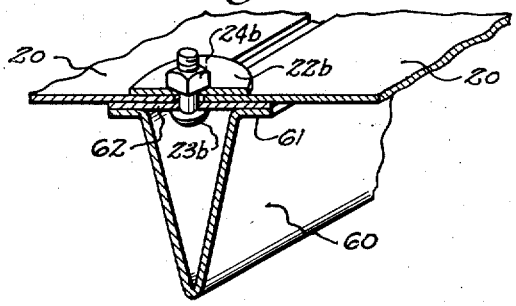

The invention will be more readily understood from a reading of the following specification and by reference to the accompanying drawings, in which an example of the invention is shown, and wherein:

Figure 1 is a view partly in elevation and partly in section showing a portion of a bubble tower constructed in accordance with the invention, Figure 2 is a horizontal, cross-sectional view taken on the line 2—2 of Figure 1, Figure 3 is an enlarged partial plan view of the bubble tray shown in Figure 2, Figure 4 is a transverse, vertical, sectional view taken on the line 4—4 of Figure 3, Figure 5 is an enlarged plan view of one end of one of the supporting trusses and showing its connection with the tank wall, Figure 6 is a vertical, sectional view taken on the line 6—6 of Figure 5, Figure 7 is an enlarged transverse, vertical, sectional view taken through the upper portion of one of the trusses and showing the connection between said trusses and the floor sections of the tray, Figure 8 is an enlarged side elevation of a portion of one of the trusses, Figure 9 is a partial isometric view of said truss, Figure 10 is a transverse, vertical sectional view taken on the line 10—10 of Figure 5, Figure 11 is a plan view showing the connection between one of the main trusses and a cross truss, Figure 12 is a vertical, sectional view taken on the line 12—12 of Figure 11, Figure 13 is a transverse, vertical, sectional view taken on the line 13—13 of Figure 11, Figure 14 is a view similar to Figure 7 showing another method of fastening the floor sections to each truss, Figure 15 is a similar view showing still another means of securing the floor sections in place, Figure 16 is a view similar to Figure 7 and showing the retaining washer permanently secured to the fastening bolt, Figure 17 is an isometric view of the washer and bolt shown in Figure 16, Figure 18 is a horizontal, cross-sectional view taken on the line 18—18 of Figure 1, and showing a modified construction for the tray, Figure 19 is a transverse, vertical, sectional view taken through one of the elongate risers in the tray shown in Figure 18, Figure 20 is a partial transverse, vertical, sectional view of a bubble tower showing another form of constructing the bubble trays and the downcomers, Figure 21 is a horizontal, cross-sectional view taken on the line 21—21 of Figure 20, Figure 22 is an enlarged sectional detail showing the construction of one of the downcomers between the bubble trays, and Figure 23 is a partial isometric view illustrating the form of truss employed in constructing the trays shown in Figure 20.

In the drawings (Figure 1), the numeral 10 designates a cylindrical tank which forms the shell of a bubble tower. Only a portion of said tank is shown and it is pointed out that said tank may be of any desired diameter and height. A plurality of transversely extending bubble trays are mounted at spaced elevations throughout the height of the tank in the usual manner, and said trays will vary in number according to the size of the tank. Three of the bubble trays, A, B and C have been shown, but it is noted that additional trays (not shown) are located above and below the trays illustrated. The operation of the bubble tower in fractionating the hydrocarbon liquid which is conducted through the trays of the tower forms no part of the present invention and any of the conventional methods of operation may be employed.

The invention has to do primarily with the construction of the tank and particularly with the construction and mounting of the bubble trays and, as clearly shown in Figures 1 and 4 to 8, an annular flanged ring 11 is secured to the inside wall of the tank 10 adjacent the bubble tray A. This ring is welded or otherwise secured to the tank wall and is present in all bubble tower tanks, being ordinarily employed for supporting the tray floor thereon. In order to protect the inner wall of the tank from corrosion, an inner liner L, which is made of a corrosive resistant material, covers said inner wall. This liner is constructed of a plurality of sections 10', each of which extends vertically between the flanged rings 11. Each section is formed with vertical flanges at its edges and these flanges may be welded, or otherwise secured, to vertical ribs 10A which are fastened to the tank wall. As is clearly shown in Figure 3, an offset 10B is formed in the member adjacent each vertical flange and such offset permits the main portion of each section between the flanges to undergo limited expansion and contraction due to temperature changes. Manifestly, the liner L, being of a corrosive resistant material, protects the wall of the tank.

Instead of supporting the tray floor on the annular flanged ring 11, as is the usual practice, a plurality of transversely extending trusses T are mounted within the tank. The trusses have their ends secured to the flange 11, as will be explained, and extend in parallel relation across the interior of the tank, whereby the tray floor may be supported thereon.

It is desirable that the trusses be of non-corrosive metal, such as stainless steel, so as to resist corrosion caused by acids present in the hydrocarbon liquid flowing through the tower and it is also desirable that said metal be relatively thin, whereby the cost thereof is held within reasonable limits and also whereby the trusses will be light in weight so as to be readily handled.

In order to construct the trusses to meet the above requirements, each truss T is fabricated of relatively thin stainless steel and includes a longitudinal top channel 12 (Figures 3 to 9) which has its flanges 13 directed downwardly. A bottom angle bar 14 is spaced from the channel bar and is disposed centrally beneath the same, extending substantially throughout the length thereof. The flanges of the channel are secured to the angle bar by inclined braces or struts 15 which have their upper ends fastened to the inner sides of the flanges 13, while their lower ends overlie and are connected to the angle. The connections between the braces or struts and the channel and angle bar are preferably made by spot welding but other means of fastening may be employed. As is clearly shown in Figures 8 and 9, the braces or struts are spaced longitudinally of the channel 12 and bar 14 and are disposed alternately on opposite sides of these members in staggered relation. In this manner, a minimum number of braces or struts, giving the necessary rigidity to the truss, may be used. It is noted that the braces are constructed of thin stainless steel and may be made from the same strip of material from which the channel member 12 is formed, whereby the stainless steel may be purchased in long strips and the channels and struts formed therefrom, which makes for economic purchase of the material.

From the above, it will be seen that each truss is fabricated of stainless steel, or other corrosion resistant metal, and a minimum amount of material is necessary. The truss has sufficient rigidity to support its tray and is of sufficiently light weight to permit ready handling thereof. As explained, each truss T extends transversely within the interior of the tank 10 and the ends of the top channel member 12 terminate adjacent the annular flange 11 which is secured to the inner wall of the tank. The top of said channel is flush with the top of the flange.

For securing the ends of each truss T to the tank wall, a pair of retaining plates 16 are secured to each end of the truss (Figures 5 and 6) and these plates are welded or otherwise secured together in abutting relation. The plates are located centrally of the channel member 12 and are formed with outwardly directed flanges 17 at the upper inner ends, which flanges are welded or otherwise fastened to the underside of said channel. The lower ends of the plates are inclined outwardly to overlie the angle bar 14 (Figure 10) and said lower ends are suitably secured, as by welding, to the bar. The outer ends of the plates 16 extend beneath the annular flange 11, as is clearly shown in Figures 5 and 6, and these outer ends are confined between a pair of spaced angle members 18 which are fastened to, and project outwardly from the vertical portion of the annular flanged member 11. The plates 16 are bolted by suitable bolts 19 and nuts 19' to the spaced angles 18 and in this manner, each truss is mounted to extend transversely across the interior of the tank.

The trusses T are disposed in parallel relation and are spaced substantially equidistant apart, whereby the floor of the tray A may be supported thereon. This floor is constructed in sections, with each section 20 being of such width as to extend from one truss to the adjacent truss. This distance is relatively narrow, whereby the floor sections may be made relatively thin which permits the same to be constructed of stainless steel, or other corrosion resistant metal without excessive cost. The length of the sections is such that said sections extend transversely across the tank 10 from wall to wall.

Each floor section 20 has one longitudinal edge supported on one of the trusses T while the longitudinal edge of the adjacent section is also supported on said truss, these edges resting on the top channel 12 of said truss and being spaced from each other (Figures 4 and 7). For securing the longitudinal edge portions of adjacent floor sections to the truss T, the channel member 12 of each truss is provided with a plurality of openings or bolt holes 21 which are spaced centrally throughout the length thereof. Enlarged washers 22 overlie the adjacent longitudinal edges of the floor sections and are alined with the bolt holes 21 in the channel. Headed bolts 23 pass through the washers 22, downwardly through the space between the adjacent longitudinal edges of the floor sections and then through the holes 21 in the channels. Nuts 24 are screwed onto the lower ends of said bolts and serve to clamp the longitudinal edge portions of the adjacent floor sections between the overlying washers 22 and the channel 12 of the truss. With such arrangement, the sections are firmly held in position but may undergo limited lateral movement to compensate for thermal expansion and contraction due to temperature changes.

Each floor section 20 is formed with a plurality of relatively large openings 25 which permit vapors from below the tray A to rise above said tray. As clearly shown in Figure 4, the material of which the section 20 is constructed is bent upwardly to provide an annular inclined lip or flange 26 around each opening. These lips add rigidity to the floor section, acting as reinforcing ribs, and also each lip co-acts with a riser 27 which is mounted in the opening. As illustrated, each riser comprises a cylindrical pipe section having an outwardly inclined flange 28 at its lower end, which flange is arranged to abut the flange or lip 26 to limit upward movement of said riser. A transversely extending spider 29 is mounted within the upper end of the riser and a cylindrical bubble cap 30 encloses the open upper end of said riser. The cap is of a larger diameter than the riser and has its lower end resting on the floor section. An elongate bolt 31 passes through the spider 29 and through an axial opening 32 in the cap 30 and receives a nut 33 to fasten the cap and riser in position. The lower portion of the cap is cut out in the usual manner to provide outlet openings, whereby vapors rising beneath the cap 30 may pass downwardly between the riser and cap to escape through said outlet openings. It is noted that although the above method of mounting the bubble caps and risers in the floor sections has been found desirable, other methods may be employed. The bubble cap has been shown as constructed of an upper section 30*a*, which is of relatively thin metal, and a lower section or ring 30*b* which is of heavier material. This ring is serrated to provide the outlet openings and legs 30*c* are welded to the ring and rest on the tray floor. This provides an effective cap of corrosive resistant material, which is relatively cheap in manufacture, although other types of caps may be employed.

As is well known, a liquid is conducted to each tray from the tray thereabove and said liquid flows diametrically across said tray to downcomers 35 which lead to the tray therebelow. The downcomers 35 are located at the periphery of the tank and are disposed diametrically opposite the point of introduction of the liquid to the tray. Although it would be possible to support the downcomers 35 within one of the floor sections 20 of the tray A, it is preferable that the downcomers be supported in smaller floor sections 20', provided for the purpose. A trio of sections 20' are shown and these sections are supported by one of the trusses T, by the annular flange 11 and by cross trusses T8. The cross trusses extend from the truss T to the wall of the tank and are disposed at substantially a right angle to the truss T (Figure 2).

Each cross truss T' is constructed in the same manner as the trusses T and has one end provided with the retaining plates 16, whereby it may be bolted to the spaced angles 18 secured to the flange 11. The opposite end of each cross truss terminates adjacent the first truss T and has an angular connecting member 36 secured thereto. As shown in Figures 12 and 13, the member 36 has a flange 37 which is welded to the underside of the top channel of the cross truss T'. The depending portion of the member is inclined to follow the contour of one of the struts 15 of the truss T and a bolt 38 and nut 39 fasten the member to the strut, whereby the cross truss T' is secured to the truss T. The top channels 12 of the trusses T and T' are of course disposed in the same plane, whereby the floor section 20' may be supported thereon. The sections 20' are secured to the cross trusses T' and the main truss T by the retaining washers 22 and bolts 23 in the same manner as the other sections 20 are secured to the trusses T.

The downcomers 35 may be mounted in the sections 20' in any suitable manner and, as illustrated, have their upper portions extending through openings 40' in the sections 20' whereby their upper ends are in a plane above the tray floor. The distance between the top of said downcomers and the floor controls the liquid level in the tray. It is preferable to weld the downcomers to the sections 20' but they may be otherwise fastened. In addition to the downcomers 35, the sections 20' may have risers 27 and bubble caps 30 supported therein. It is noted that the sections 20' could be eliminated and a single floor section 20 substituted therefor although assembly would be more difficult if all the downcomers were supported in a single section. The downcomers 35, as well as the sections 20' and trusses T' are constructed of a corrosion resistant metal.

Although the floor sections 20 have been shown as secured to the trusses T by the overlying washers 22, other means of fastening said sections in place may be employed. As illustrated in Figure 14, the adjacent, longitudinal edges of the floor sections may be turned upwardly to provide a longitudinal flange 40 on each section. Washers 22' are then placed on the flanges and bolts 23' may extend through the washers and through the holes 21 in the top channel of the truss. The bolts 23' receive nuts 24' and, in this manner, the sections are fastened to the truss and may undergo limited lateral movement to compensate for thermal expansion and contraction. By forming the flanges 40 on the longitudinal edges of each section, rigidity and strength is added to the sections.

Another method of securing the sections to the trusses is shown in Figure 15, wherein a flanged washer or channel 41 is employed in place of the washer 22. The lower edge of the washer engages the floor sections to clamp the same against the truss, said washer being held in clamping position by the bolt 23' and nut 24'.

In Figures 16 and 17, still another fastening means is shown wherein a washer 22a is welded or otherwise secured to a bolt 23a, which bolt has a substantially flat head. The bolt passes through the bolt hole 21 in the channel and receives a nut 24a. To prevent rotation of the bolt when the nut is tightened thereon, the washer is formed with diametrically opposed lugs 42 which are arranged to depend into the space between the longitudinal edges of the floor sections. Manifestly, all of the fastening means shown permit thermal expansion and contraction of the floor sections. In the floor shown in Figures 16 and 17, the large bolt head may be eliminated whereby the flat head lies substantially flush with the tray floor.

From the foregoing, it will be seen that the trusses T and T' may be fabricated of a corrosion resistant metal of a light gage, whereby the weight and cost thereof is materially reduced. The tray floor may be also constructed of a thin metal, which makes possible the use of a corrosion resistant metal at a minimum cost. The construction gives the tray sufficient rigidity and strength for its purpose and the assembly is greatly simplified since the parts are light in weight and easily handled. The method of fastening the floor sections of the tray to the trusses eliminates the necessity of providing bolt holes in said sections and this further reduces the cost of manufacture.

A tray A has been shown as comprising a plurality of parallel main trusses T with cross trusses T' for supporting the downcomers 35. This construction is suitable but it may be desirable to change the shape of the floor sections 20 in order to accommodate other types of risers, or for other reasons, and in such cases the tray could be constructed in the manner in which the tray B is made. This tray B includes a pair of main elongate trusses T which extend from wall to wall of the tank. A plurality of cross trusses T2 extend from the wall of the tank to one of the trusses, while other cross trusses T3 extend between and connect the trusses T (Figure 18). A pair of additional cross trusses T4 which are relatively short extend from one of the trusses to the wall and these trusses are spaced from each other. Floor sections 20a are supported on the trusses T, T2, T3, T4, and the flange 11, being secured to the trusses by the washers 22 and bolts 23. No floor sections are located between the short trusses T4, whereby an opening 44 is provided in the floor. A take off well 45 is formed below the opening 44 by an angular partition 46, which may be constructed in any suitable manner. A take off pipe 47 leads from the well for conducting the liquid therefrom. To maintain the liquid level in the tray B, angle bars 48 are secured to the floor adjacent the well and, obviously, the level in the tray must overflow the angle bars before it can enter the well.

In place of the cylindrical openings 25 and risers 27, the floor sections 20a are provided with elongate narrow openings 49. A riser 50 extends upwardly from each opening and has a general rectangular shape in cross-section. Each riser is constructed of a thin corrosion resistant metal, and includes two sides 50' which are connected by end plates 50a. Each side is flanged at its upper and lower ends to give the same rigidity and an elongated bubble cap 51 is suitably mounted to enclose the riser. It is noted that this type of riser may, if desired, be employed in the sections 20 of the tray A.

Downcomers 35' are mounted in openings in the floor sections 20a and are disposed diametrically opposite the well 45. Instead of being of one piece as are the downcomers 35 in the tray A, the downcomers 35' are constructed of two halves or sections. Each section is provided with vertical flanges 35a which are welded, or otherwise secured together and, obviously, said flanges add rigidity to said downcomers. Manifestly, this type of downcomer may be used in the other bubble trays of the tower. It is pointed out that all of the trays in the bubble tower may be constructed either as the tray A or as the tray B or some may be like A while others are like B. The two types of construction have been shown to illustrate variations which can be made and so long as the trusses are employed for supporting the tray floor, said floor may be constructed of light material and one of the main purposes of the invention is accomplished.

It is desirable to fabricate the trusses T and T' in order to minimize the material necessary so as to reduce the cost of manufacture but other types of trusses may be employed. In Figures 20 to 23, a V-type truss 60 is shown. This truss is constructed of corrosion resistant metal and is substantially V-shape in cross-section. Outwardly directed flanges 61 are provided at the upper end thereof and a flat plate or strip 62 is welded or otherwise secured to side flanges. The strip 62 provides a flat surface which is the equivalent of the top channel 12 of the trusses T and the floor sections 20 may be secured thereto by the washers 22b, bolts 23b and nuts 24b. Each bolt may have its head welded or otherwise fastened to the strip 62 before the same is welded to the flanges 61 and in such case, the bolt extends upwardly through the washer 22b to receive the nut 24b which, in this instance, is located above the tray floor.

It may not be desirable to employ the downcomers 35 and 35' and, in such case, a weir type downcomer 63 may be employed (Figures 20 to 22). No floor section is mounted between the tank wall and the end truss 60 whereby an opening 64 is formed in the tray floor at one side of the tank. A transversely extending, vertical partition 65 has its upper end flanged at 66 and this flange overlies one longitudinal edge of the truss being secured thereto by the nuts 24b and bolts 23b. The partition is made in two sections bolted together by bolts 66' which pass through abutting flanges in said sections. The vertical edges of the partition are secured to vertical angle bars 66a which are mounted on the tank wall. The lower end of the partition also has a flange 67 which is secured to vertical straps 68 extending upwardly from the tray therebelow. An angle bar 69 which controls the liquid level in the tray is secured to the end truss adjacent the opening 64 in the tray floor. Manifestly, the liquid from the uppermost tray will overflow the flange and will pass downwardly through the downcomer formed by the wall of the tank and the partition 65. The liquid will thus flow to the tray next below, passing between the straps 68 which support the partition. It is pointed out that this type of downcomer may be employed in the other forms, in place of the downcomers 35 or 35'.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A bubble tower including a tank, a plurality of bubble trays mounted within the tank, each tray comprising a plurality of approximately parallel supporting trusses fabricated of a corrosion resistant metal and mounted to extend transversely of the tank, a plurality of elongate floor sections constructed of a relatively thin corrosion resistant metal and having approximately spaced parallel edges supported longitudinally thereof on said trusses, vertical downcomers having their upper ends secured in certain of the floor sections and depending therefrom, and vapor risers mounted in the floor sections and having bubble caps mounted thereon.

2. A bubble tower including, a tank, a plurality of bubble trays mounted within the tank, each tray comprising a plurality of supporting trusses fabricated of a corrosion resistant metal and mounted to extend transversely of the tank, a plurality of elongate floor sections constructed of a relatively thin corrosion resistant metal and having their longitudinal edges supported on said trusses, means for frictionally clamping the longitudinal edges of the floor sections to the trusses in spaced order, whereby vertical displacement of the section is prevented while limited lateral movement thereof is permitted, vertical downcomers having their upper ends secured in certain of the floor sections and depending therefrom, and vapor risers mounted in the floor sections and having bubble caps mounted thereon.

3. A bubble tray for a bubble tower tank including, a plurality of transverse trusses mounted within the tank with their ends secured to the tank wall, a plurality of elongate floor sections supported on the trusses, each section spanning the space between two of the trusses with its longitudinal edge portions resting on said trusses and spaced apart, and frictional clamping means engaging the longitudinal edge portions of adjacent floor sections for securing said sections to the trusses, said means being arranged to permit limited lateral movement of the floor sections with relation to the trusses.

4. A bubble tray for a bubble tower tank including, a plurality of transverse trusses adapted to be mounted within the tank with their ends secured to the tank wall, each truss being constructed of a relatively thin metal and comprising an upper channel member, a lower angle member extending parallel to the upper member, vertical braces connecting the members, and a plurality of floor sections supported on the trusses.

5. A bubble tray for a bubble tower tank including, a plurality of transverse trusses adapted to be mounted within the tank with their ends secured to the tank wall, each truss being constructed of a relatively thin metal and comprising an upper channel member, a lower angle member extending parallel to the upper member, vertical braces connecting the members, a plurality of floor sections supported on the trusses, each section spanning the space between two of the trusses with its longitudinal edge portions resting on said trusses, and means engaging the longitudinal edge portions of adjacent floor sections and secured to the trusses for fastening the sections to said trusses.

6. A bubble tray for a bubble tower tank including, a plurality of transverse trusses adapted to be mounted within the tank with their ends secured to the tank wall, each truss being constructed of a relatively thin metal and comprising an upper channel member, a lower angle member extending parallel to the upper member, vertical braces connecting the members, a plurality of floor sections supported on the trusses, each section spanning the space between two of the trusses with its longitudinal edge portions resting on said trusses, the edges of the adjacent sections being spaced from each other, a plurality of bolts mounted in the trusses and extending upwardly between the edges of the floor sections, and means carried by the bolts and engaging the sections for frictionally fastening the sections to the trusses.

7. A bubble tower including, a tank, a plurality of bubble trays within the tank, each tray including a plurality of supporting trusses, each truss having a lateral extension at one end thereof, spaced angle members secured to the interior of the tank wall for receiving the extensions on the trusses, bolts passing through each extension and its co-acting angle members for detachably mounting the trusses within the tank, and a plurality of floor sections supported on the trusses with their longitudinal edge portions overlying the trusses, whereby said trusses provide a positive support for and impart rigidity to each section.

8. In a bubble tower, the combination of a tank, a liner of thin corrosive resistant material secured to the inner wall of the tank for protecting said wall, a plurality of superposed bubble trays mounted within the tank, each tray comprising a plurality of supporting trusses fabricated of a corrosion resistant metal and rigidly mounted to extend transversely of the tank, a plurality of elongate floor sections constructed of a relatively thin corrosion resistant metal having substantially parallel spaced edges frictionally clamped on said trusses, each floor section having vapor openings therein with an annular upset portion surrounding each opening for adding rigidity to the section and also for co-acting with a bubble cap adapted to overlie said opening.

9. A bubble tower including, a tank, a plurality of bubble trays mounted within the tank, each tray comprising a supporting member secured to the tank wall, a plurality of transversely extending trusses secured within the tank, each truss being fabricated of a plurality of pieces of relatively thin material, whereby sufficient rigidity is obtained, a plurality of elongate floor sections constructed of relatively thin metal having their longitudinal edges supported on the supporting member and trusses, and means for frictionally clamping the longitudinal edges of the sections to the trusses to permit a limited lateral movement of the sections to compensate for thermal expansion and contraction of the sections due to temperature changes.

10. As a sub-combination in a bubble-tower, a protective liner constructed of a plurality of sections arranged to overlie the wall of the tower, each section having a vertically extending flange at each longitudinal edge, and each flange being bent or offset so that when the flanges abut each other a space is provided therebetween to permit a limited movement of the sections relative to each other.

11. A tray floor for a bubble tower including, a plurality of sections of such thin metal as to require auxiliary supports to maintain them in a horizontal plane, rigid supports separate from the sections upon which edge portions of said sections are mounted, and fastening means on the supports having friction engagement with edge portions of the sections, whereby said sections may undergo expansion and contraction without buckling.

12. A tray floor for a bubble tower including, a plurality of thin sheet metal sections having their adjacent edges spaced apart and independently supported, and fastening means having friction engagement with adjacent edge portions of said sections, whereby said sections may undergo expansion without buckling when the circumferential margin of the tray is rigidly confined.

13. A tray floor for a bubble tower including, a plurality of transverse rigid supports, thin metal sheets having certain of their edges independently mounted on said supports, and friction means for confining edge portions of said sheets on said supports, the adjacent edges of sheets being spaced apart on said supports, whereby individual sheets may undergo expansion without buckling.

14. A bubble tower floor including, a plurality of trusses each being constructed of relatively thin metal and including an upright portion and a transverse top portion, a plurality of thin sheet metal sections having their edges mounted on the transverse tops of said trusses in spaced order, and friction means for confining said sheets on said trusses, whereby said sheets may undergo thermal expansion without buckling.

15. A bubble tower floor including, a plurality of trusses, one of said trusses extending transversely of the other trusses, elongate thin sheet metal sections having longitudinal edges supported on said trusses except the transverse truss and ends supported on said transverse truss, and means for frictionally clamping the longitudinal edges and ends of said sections on the trusses to permit said sections to undergo thermal expansion without buckling.

16. A bubble tower floor including, a plurality of transverse rigid trusses, thin metal sheets incapable in themselves of carrying the load imposed on the floor having certain of their edges independently mounted on said supports, and friction means for confining the edges of said sheets against vertical displacement on the trusses while permitting a limited lateral movement of the sheets relative to each other, the trusses being of sufficient rigidity to carry the load imposed on the completed floor.

17. A tray floor for a bubble tower including, a plurality of rigid supports, thin metal sheets having certain of their edge portions independently mounted on said supports, and friction means confirming adjacent edge portions of said sheets on said supports, the adjacent edge portions of said sheets being spaced apart on said supports and being imperforate, whereby individual sheets may undergo expansion and contraction without buckling.

18. A tray floor for a bubble tower including, a plurality of transverse rigid supports, thin metal sheets having edge portions independently mounted on said supports, a single row of upstanding fastenings on each of said supports between edge portions of adjacent sheets, and friction clamping means on the upstanding fastenings overlying the adjacent edge portions of said sheets.

HANS C. GLITSCH.

REFERENCES CITED

The following references are of record in the file of this patent:

UNITED STATES PATENTS

| Number | Name | Date |
|---|---|---|
| 1,226,898 | Lummus | May 22, 1917 |
| 1,664,483 | Piron | Apr. 3, 1928 |
| 1,669,690 | Brandl | May 15, 1928 |
| 1,738,036 | Chillas, Jr. | Dec. 3, 1929 |
| 1,848,945 | Genter | Mar. 8, 1932 |
| 1,871,819 | Monro | Aug. 16, 1932 |
| 1,893,906 | Primrose et al. | Jan. 10, 1933 |
| 1,965,549 | Holmes et al. | July 3, 1934 |
| 2,007,117 | Wiezevich | July 2, 1935 |
| 2,045,518 | Chatfield | June 23, 1936 |
| 2,060,601 | Wentworth | Nov. 10, 1936 |
| 2,175,360 | Peff | Oct. 10, 1939 |

FOREIGN PATENTS

| Number | Country | Date |
|---|---|---|
| 210,009 | Germany | May 21, 1909 |